Patented Sept. 8, 1931

1,822,210

UNITED STATES PATENT OFFICE

DANIEL GARDNER, OF RUEIL, FRANCE

PROCESS FOR THE MANUFACTURE OF PURE COLOPHONY AND OTHER RESINOUS PRODUCTS FROM RESINOUS PLANTS OR WOODS

No Drawing. Application filed March 29, 1928, Serial No. 265,821, and in France April 30, 1927.

This invention relates to the manufacture of pure colophony or other resinous products from resinous plants or woods by a process of the known kind wherein the raw materials are divided up into pieces or cut up into chips, shavings or the like are first heated with steam and subsequently acted upon with an alkaline solution in the presence of a reducing substance which latter is included with the object of avoiding oxidation and discolouration of the resin during its subsequent precipitation from the alkaline extraction liquor on separation of the latter from the woody or cellulose residue.

The object of the present invention is to provide improvements in processes of the above type aiming at the obtension of a higher recovery of resin product of notable purity and rendering it possible to combat further tendencies of the resin to become oxidized and further discoloured such as are present in known methods by raising of the temperatures and other conditions therein essential to the saponification step.

A feature of the invention which has been found to be of great importance consists in the drying of the steam-treated mass as above referred to and subjection of same to further subdivision to a condition of dry powder, which powder is impalpable or at least very little short of that condition, before conducting the extraction step on the foregoing lines. The drying step ensures a very thorough expulsion of moisture from the mass and likewise of such volatile products as remain in the latter according to the ordinary methods, while the very fine condition of subdivision referred to greatly simplifies the subsequent steps of the process and enables more favourable temperature and other conditions to be employed in the subsequent steps as will be made clear in the following description. A further feature consists in conducting the initial steam treatment of the raw material with steam at atmospheric pressure, and in steam at a pressure not exceeding two atmospheres, and the alkaline solution used for acting on the material which has been dried and reduced to a powder should titrate to the low concentration of about 2 to 2.5° Baumé, that is, about 1.2 to 1.6 per cent. in the case of caustic soda.

When the dried material is reduced to the state of an impalpable powder the attack by the said alkaline solution takes place conveniently in a colloidal mill at a temperature of about 30° C. and preferably in the presence of a substance such as an oleate of an alkali metal or radical which facilitates the incorporation of the resinous part.

When, however, the dried material is not absolutely reduced to the state of an impalpable powder the alkaline treatment is conveniently effected in a closed apparatus permitting the circulation or agitation of the product to be treated at a temperature of the order of 75 to 85° C.

For the recovery of the cellulose material left by extraction of the resin by the weak alkaline liquor, said material is treated with an alkaline solution titrating about 7 to 8° Baumé in a closed apparatus in order to obtain the ligneous pulp, this treatment taking place under pressure and with the application of heat.

In carrying the invention into effect in one form by way of example for the preparation of resinous products, more particularly colophony, having no coloration, the raw material employed comprises as hitherto resinous plants or woods suitably divided into pieces or cut up into shavings, the trunk or the roots of the aforesaid woods or plants preferably being selected for the purpose.

The raw material above referred to is, in the usual manner, treated with steam in order to eliminate turpentine and other products volatile at the temperature of the steam employed, and which products vary according to the nature of the raw material. In order to obtain a highly effective treatment with the steam this treatment is according to this invention effected at atmospheric pressure, and in any case at pressures not much, if at all, in excess of two atmospheres.

After the steam treatment there is obtained a product containing resinous material such for example as colophony and cellulose.

The product is then subjected to drying which completes the elimination of all the volatile products and of the moisture, and allows of reducing the dried material to a state of more or less fine powder.

According to the degree of fineness of the powder the operations to which this powder is subjected vary considerably.

The powder in the example under consideration may, for instance, be reduced to an impalpable state and is then treated with an alkaline solution, for instance, a solution of caustic soda having a degree of concentration of 2 to 2.5° Baumé, that is, a sodium hydroxide solution of substantially 1.2 to 1.6 per cent. strength. This treatment is effected at a suitable low temperature, preferably as low as possible, for instance at a temperature of the order of 30° C. The alkaline treatment is, however, always effected in the presence of a reducing substance preferably an alkali metal-sulpho compound such as sodium or potassium bisulphite, or sodium hydrosulphite, the degree of concentration of which should not exceed about 2 per cent.

The attack of this impalpable powder by the alkaline solution above referred to is conveniently carried out in a collodial mill working at high speed, for example 15,000 revolutions per minute and, further, preferably in the presence of a small quantity of a substance such as an oleate of an alkali metal or radical preferably ammonium oleate for facilitating the incorporation of the resinous part into the lye.

The product from the colloidal mill comprises soaps and cellulose and is treated with any convenient acid in known manner, preferably in a continuous manner, to remove the cellulose part, decompose the soap and precipitate out the resinous matter.

By working under these conditions the oxidation of the resinous material, at the moment of or during the precipitation of the colophony or the like, by the action of the acid, is avoided. When the soap is decomposed by the acid the colophony or the like is filtered off and treated in any usual manner with a suitable organic solvent for resin such as turpentine, ligroin, benzene or the like. There is thus obtained a colophony or other resin which is extremely pure, uncoloured and free from oxidation products.

The cellulose remaining after the extraction of the resin by the dilute alkali solution as above is then subjected to an alkaline treatment for example by means of a solution of caustic soda titrating from 7 to 8° Baumé or 4 per cent. to 5 per cent. strength and a ligneous pulp of high purity and remarkable for its freedom from resin is obtained which serves as for the manufacture of cardboard and paper.

In an alternative procedure when the powder obtained after the drying and reducing the state of subdivision of the steamed material is less fine and is even granulated, the treatment with the alkaline solution in the presence of the reducing material as indicated above is best effected in the known manner in an apparatus where circulation or agitation of the mass is conveniently provided for, as for example by a steam injection. However, in operating according to this modification I also depart from the current practice in which the temperatures utilized are of the order of 100 to 200° C., and I avoid such high temperatures, whereby to avoid browning of the resin obtained by the subsequent decomposition of the resinous soap by the acid. I have found that a suitable temperature for the alkaline treatment in such a case is of the order of 75 to 85° C. and in addition that excess of acid should not be used over that required to precipitate out the resins.

The cellulose residue obtained after the removal of the soap is treated with the application of heat and under pressure with, for instance, a caustic soda solution titrating 7 to 8° Baumé or about 4 to 5 per cent. strength, and the pulp thus obtained is, in the known manner and as above indicated, highly suitable for use as for the manufacture of paper.

The drying of the raw material (after the treatment with steam as indicated above) followed by further reduction of its state of subdivision to a finely powdered and preferably impalpable state enables better results to be obtained, than when the steam-treated material is incorporated directly with the alkaline solution. For instance in the latter case the resin soap solution obtained will still be slightly coloured and will not give, after separation from the woody residue and the treatment, such a very pure resin as do the earlier examples. It is only after several treatments with a suitable solvent such as turpentine as above indicated that it would be possible to decolorize the resinous product so obtained.

It is to be understood that the invention has been here described only by way of explanation and is in no way limited to the various examples given, as various modifications in detail at least may be effected without departing from the spirit thereof.

Having now described my invention, what I claim as new and desire to secure by Letters Patent is:—

1. In a process for the extraction of resin, subjecting a dry substantially volatile-free resin-bearing cellulosic powder in a condition approximating to impalpability to treatment with a weak caustic alkaline liquor of not more than 2 per cent. concentration and containing not more than 2 per cent. dissolved reducing agent.

2. In the process according to claim 1, conducting said liquor treatment at a temperature not greater than about 85° C.

3. In a process for the extraction of resin, subjecting a dry substantially volatile-free resin-bearing cellulosic powder in a condition of impalpability to treatment with caustic alkali solution of substantially 1.2 to 1.6 per cent. concentration and containing not more than about 2 per cent. reducing agent at a temperature of the order of 30° C.

In testimony whereof I have signed my name to this specification.

DANIEL GARDNER.